United States Patent
Hayashi et al.

(10) Patent No.: US 9,263,923 B2
(45) Date of Patent: Feb. 16, 2016

(54) ELECTRIC MOTOR HAVING FIRST FRAME AND SECOND FRAME FASTENED TOGETHER WITH THROUGH BOLT

(71) Applicant: DENSO CORPORATION, Kariya, Aichi-pref. (JP)

(72) Inventors: Jirou Hayashi, Ama (JP); Hiroshi Katai, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 280 days.

(21) Appl. No.: 13/947,488

(22) Filed: Jul. 22, 2013

(65) Prior Publication Data
US 2014/0021831 A1 Jan. 23, 2014

(30) Foreign Application Priority Data
Jul. 20, 2012 (JP) ................... 2012-161740

(51) Int. Cl.
*H02K 5/04* (2006.01)
*H02K 11/00* (2006.01)
*H02K 5/22* (2006.01)
*H02K 5/15* (2006.01)

(52) U.S. Cl.
CPC .. *H02K 5/22* (2013.01); *H02K 5/04* (2013.01); *H02K 5/15* (2013.01); *H02K 11/0068* (2013.01)

(58) Field of Classification Search
CPC ................ H02K 5/00–5/26; H02K 11/0021
USPC ................................. 310/89, 68 D
See application file for complete search history.

(56) References Cited

U.S. PATENT DOCUMENTS

| 5,334,897 | A | * | 8/1994 | Ineson et al. ............... 310/89 |
| 6,057,621 | A | | 5/2000 | Suzuki et al. |
| 6,337,530 | B1 | | 1/2002 | Nakamura et al. |
| 6,577,030 | B2 | * | 6/2003 | Tominaga et al. ......... 310/68 B |
| 2003/0173839 | A1 | * | 9/2003 | Torii et al. ................. 310/52 |
| 2007/0241633 | A1 | | 10/2007 | Kusase et al. |
| 2010/0308700 | A1 | * | 12/2010 | Isoda et al. ............... 310/68 D |

FOREIGN PATENT DOCUMENTS

| JP | 3-26259 | 3/1991 |
| JP | 4-109839 | 4/1992 |
| JP | 7-245901 | 9/1995 |
| JP | 2003-274606 | 9/2003 |
| JP | 2012-16235 | 1/2012 |

OTHER PUBLICATIONS

Machine Translation, Kuribayashi, JP 07245901 A, Sep. 19, 1995.*
Office Action (4 pages) dated Jun. 9, 2015, issued in corresponding Japanese Application No. 2012-161740 and English translation (4 pages).

* cited by examiner

*Primary Examiner* — Thomas Truong
(74) *Attorney, Agent, or Firm* — Nixon & Vanderhye P.C.

(57) ABSTRACT

A rear frame has a fastening portion, which radially extends from an outer peripheral surface of the rear frame and receives a fastening force of a through bolt. A circuit board, which includes a control circuit, is installed to an axially outer surface of a main body of the rear frame. A reinforcing portion is provided in the fastening portion to limit deformation of the main body of the rear frame, which is induced by the fastening force of the through bolt.

8 Claims, 4 Drawing Sheets

ELECTRIC MOTOR HAVING FIRST FRAME AND SECOND FRAME FASTENED TOGETHER WITH THROUGH BOLT

CROSS REFERENCE TO RELATED APPLICATION

This application is based on and incorporates herein by reference Japanese Patent Application No. 2012-161740 filed on Jul. 20, 2012.

TECHNICAL FIELD

The present disclosure relates to an electric motor.

BACKGROUND

For instance, JPH11-146616A (corresponding to U.S. Pat. No. 6,057,621) recites an electric motor, in which a stator is clamped by two frames in an axial direction of the motor. With this construction, a required precision can be lowered in comparison to a case where the stator (more specifically, a stator core) is press fitted or shrink fitted into a cylindrical housing. Thus, the manufacturing of the electric motor is eased.

A fastening method for fastening the respective frames of the above electric motor may include inserting a through bolt through corresponding holes of the frames on a radially outer side of the stator while holding the stator between the frames and thereafter fastening the frames together by tightening the through bolt, so that movement of the frames away from each other in the axial direction is limited. However, when this fastening method is used in a case where a circuit board, which includes a control circuit, is provided to one of the frames, the frame, to which the circuit board is provided, may possibly be deformed upon the tightening of the through bolt to cause a damage of the circuit board, thereby possibly resulting in a start failure of the electric motor.

SUMMARY

The present disclosure addresses the above disadvantage. According to the present disclosure, there is provided an electric motor that includes a stator, a first frame, a second frame and a through bolt. The first frame and the second frame axially hold the stator therebetween. The through bolt is placed on a radially outer side of the stator and fastens the first frame and the second frame together to limit movement of the first frame and the second frame away from each other. Each of the first frame and the second frame includes a main body, which is configured into a circular disk form, and a stator holding portion, which extends from the main body in an axial direction and is configured into an annular form. The stator holding portion of the first frame and the stator holding portion of the second frame clamp the stator therebetween in the axial direction. The first frame has a fastening portion, which radially extends from an outer peripheral surface of the first frame and receives a fastening force of the through bolt. A circuit board, which includes a control circuit, is installed to an axially outer surface of the main body of the first frame. At least one deformation limiting portion is provided in the fastening portion to limit deformation of the main body of the first frame, which is caused by the fastening force of the through bolt.

BRIEF DESCRIPTION OF THE DRAWINGS

The drawings described herein are for illustration purposes only and are not intended to limit the scope of the present disclosure in any way.

DETAILED DESCRIPTION

An embodiment of the present disclosure will be described with reference to the accompanying drawings.

Figure 1:
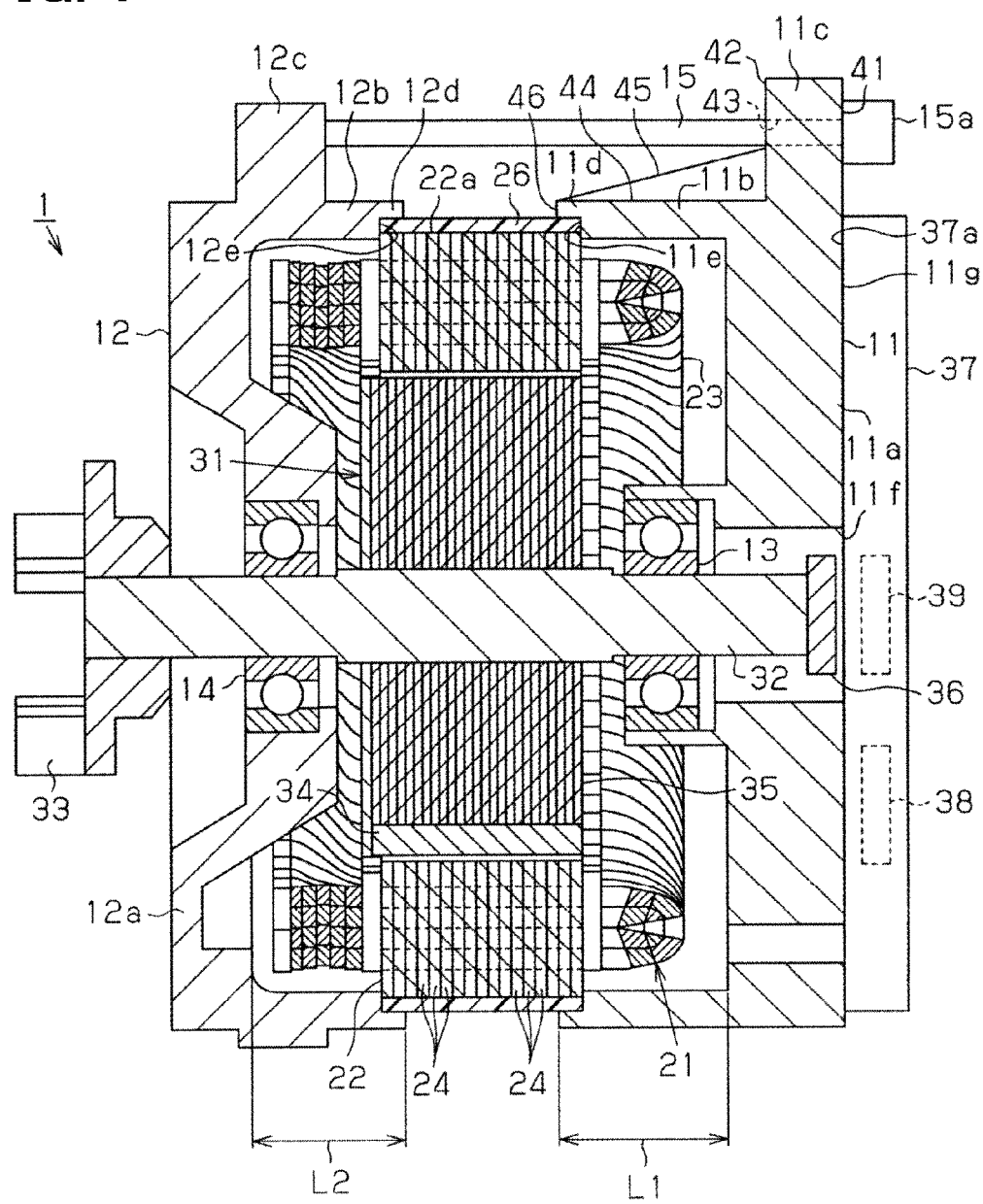
FIG. 1 is a cross-sectional view of an electric motor according to an embodiment of the present disclosure.

With reference to FIG. 1, an electric motor (hereinafter simply referred to as a motor) 1 of the present embodiment includes a rear frame (serving as a first frame) 11, a front frame (serving as a second frame) 12, a stator 21 and a rotor 31. The stator 21 is configured into an annular form and is clamped between the rear frame 11 and the front frame 12 in an axial direction of the motor 1. The rotor 31 is placed radially inward of the stator 21. The front frame 12 is a frame, which holds one axial side (a joint 33 side) of the motor 1 (more specifically the stator 21). The rear frame 11 is a frame, which holds the other axial side of the motor 1 (more specifically the stator 21), which is opposite from the one axial side. A plurality (two in this embodiment) of through bolts 15 is placed on a radially outer side of the stator 21 and fastens the front frame 12 and the rear frame 11 together, thereby limiting movement of the front frame 12 and the rear frame 11 away from each other.

The stator 21 includes a stator core 22 and coils (windings) 23. The stator core 22 is configured into an annular form, and the coils 23 are wound around the stator core 22. The stator core 22 includes a plurality of core sheets 24. Each core sheet 24 is formed through stamping of a steel plate in a press working process. The core sheets 24 are stacked one after another in the axial direction and are interlocked through application of a compressive force to produce the stator core 22 in a form of a laminated core. An outer peripheral surface 22a of the stator core 22 is configured into a cylindrical form. The outer peripheral surface 22a of the stator core 22 is covered with a cover member 26, which is configured into a cylindrical tubular form and is made of a resin material (e.g., a heat-shrinkable film).

Each of the rear frame 11 and the front frame 12 is made of a metal material (e.g., aluminum or steel). The rear frame 11 includes a main body 11a and a stator holding portion 11b. The main body 11a is configured into a circular disk form. The stator holding portion 11b is configured into a cylindrical tubular form (an annular form, i.e., a ring form) and extends from an outer peripheral edge part of the main body 11a toward the stator 21 in the axial direction of the motor 1. Similar to the rear frame 11, the front frame 12 includes a main body 12a and a stator holding portion 12b. The main body 12a is configured into a circular disk form. The stator holding portion 12b is configured into an annular form and extends from an outer peripheral edge part of the main body 12a toward the stator 21 in the axial direction of the motor 1.

A bearing 13 is held in a radial center part of the main body 11a of the rear frame 11. A bearing 14 is held in a radial center part of the main body 12a of the front frame 12 and is arranged coaxially with the bearing 13. Furthermore, the main body 11a has a plurality (e.g., two) of fastening portions (also refer to as rear-side fastening portions) 11c, which are formed integrally with the main body 11a. The fastening portions 11c radially outwardly extend from the outer peripheral edge part of the main body 11a. Similarly, the main body 12a has a plurality (e.g., two) of fastening portions (also referred to as front-side fastening portions) 12c, which are formed integrally with the main body 12a. The fastening portions 12c radially outwardly extend from the outer peripheral edge part of the main body 12a. FIG. 1 shows only one of the fastening portions 11c and only one of the fastening portions 12c.

The number of the fastening portions 11c is equal to the number of the fastening portions 12c, and the fastening portions 11c are opposed to the fastening portions 12c, respectively, in the axial direction of the motor 1. The rear frame 11 and the front frame 12 are fastened together through the through bolts 15, each of which is held by a corresponding one of the fastening portions 11c and a corresponding one of the fastening portions 12c. Thereby, the rear frame 11 and the front frame 12 are securely held together in the state where the stator 21 is clamped between the rear frame 11 and the front frame 12.

The stator holding portion 11b of the rear frame 11 and the stator holding portion 12b of the front frame 12 hold the stator core 22 in the axial direction. An outer diameter of each of the stator holding portions 11b, 12b is larger than an outer diameter of the stator core 22, more specifically an outer diameter of the cover member 26 installed to the stator core 22. An inner diameter of each of the stator holding portions 11b, 12b is smaller than the outer diameter of the stator core 22. Furthermore, an axial length L1 of the stator holding portion 11b is larger than an axial length L2 of the stator holding portion 12b.

An outer fitting part 11d, 12d is formed in a distal end part (an axially inner end part, which is a stator 21 side end part) of each stator holding portion 11b, 12b. Each outer fitting part 11d, 12d is configured into an annular form and has a reduced radial wall thickness, which is reduced by increasing the inner diameter of the stator holding portion 11b, 12b in comparison to the rest of the stator holding portion 11b, 12b. The inner diameter of the outer fitting part 11d, 12d is generally equal to the outer diameter of the cover member 26, which is installed to the stator core 22. Furthermore, a contact surface 11e, 12e is formed in a radially inner part (an inner peripheral part) of each outer fitting part 11d, 12d to contact the stator core 22 in the axial direction. The contact surface 11e, 12e is planar in a direction that is generally perpendicular the axial direction, and the contact surface 11e, 12e circumferentially extends to have an annular form.

The outer fitting part 11d of the stator holding portion 11b and the outer fitting part 12d of the stator holding portion 12b are fitted to two axial end portions, respectively, of the stator core 22. An inner peripheral surface of the outer fitting part 11d and an inner peripheral surface of the outer fitting part 12d hold the outer peripheral surface of the stator core 22 through the cover member 26. The contact surfaces 11e, 12e contact the axial end surfaces, respectively, of the stator core 22. With the above construction, the stator core 22 is clamped between the rear frame 11 and the front frame 12 by the through bolts 15, so that the movement of the rear frame 11 and the front frame 12 away from each other in the axial direction is limited. The stator holding portion 11b and the stator holding portion 12b are spaced from each other in the axial direction, so that a gap is formed between the stator holding portion 11b and the stator holding portion 12b. However, direct exposure of the stator core 22 to the external air is limited by the cover member 26, which is anticorrosive. Thus, formation of rust on the stator core 22 is limited.

A rotatable shaft 32 of the rotor 31 is rotatably supported by the bearings 13, 14. A distal end portion (a left end portion in FIG. 1) of the rotatable shaft 32 projects to the outside of the motor 1 through the front frame 12. The joint 33 is provided to the distal end portion of the rotatable shaft 32 such that the joint 33 is rotatable integrally with the rotatable shaft 32. The joint 33 is connected to an external apparatus (not shown), and the rotation of the rotatable shaft 32 is conducted to the external apparatus through the joint 33.

A rotor core 35 of the rotor 31 is fixed to the rotatable shaft 32. A plurality of permanent magnets 34 is fixed to an outer peripheral surface of the rotor core 35. The permanent magnets 34 form magnetic poles. The rotor core 35 is radially opposed to an inner peripheral surface off the stator core 22.

A through-hole 11f is formed in a radial center part of the main body 11a of the rear frame 11 and axially extends through the center part of the main body 11a. A base end portion of the rotatable shaft 32 is received in the through-hole 11f of the main body 11a. Furthermore, a rotation sensing magnet 36 is installed to the base end portion of the rotatable shaft 32 to rotate integrally with the rotatable shaft 32 and is received in the through-hole 11f.

An axially outer surface 11g (an axial end surface, which is axially opposite from the stator 21) of the main body 11a is formed as a flat surface that extends in a direction that is generally perpendicular to the axis of the rotatable shaft 32. A circuit board 37, which is configured into a circular disc form, tightly contacts the axially outer surface 11g. That is, a contact surface 37a of the circuit board 37, which contacts the main body 11a, is also formed as a planar surface. The circuit board 37 is fixed to the main body 11a with screws (not shown).

A control circuit 38 and a rotation sensing device (e.g., a Hall IC) 39 are installed to the circuit board 37. The control circuit 38 controls a drive operation of the motor 1. The rotation sensing device 39 is axially opposed to the rotation sensing magnet 36. The rotation sensing device 39 senses a change in the magnetic field caused by the rotation of the sensing magnet 36. The control circuit 38 senses rotation information (e.g., a rotational angle, a rotational direction and a rotational speed) of the rotation sensing magnet 36 (and thereby of the rotatable shaft 32) based on an output signal, which is outputted from the rotation sensing device 39. The control circuit 38 controls a drive electric current, which is supplied to the coils 23 of the stator 21, based on the rotation information of the rotatable shaft 32. In this way, the desired rotation of the rotatable shaft 32 is implemented.

Next, a fastening structure of each of the front and rear frames 11, 12, which are fixed together by the through bolts 15, will be described with reference to FIGS. 1 and 2.

Each of the fastening portions 11c is configured generally into a triangular form in an axial view. An axially outer end surface (an end surface on an axial side that is opposite from the front frame 12) is a seat surface 41, which is flat and contacts a head 15a of a base end portion of the corresponding through bolt 15. The seat surface 41 receives an axial fastening force of the through bolt 15.

Figure 2:
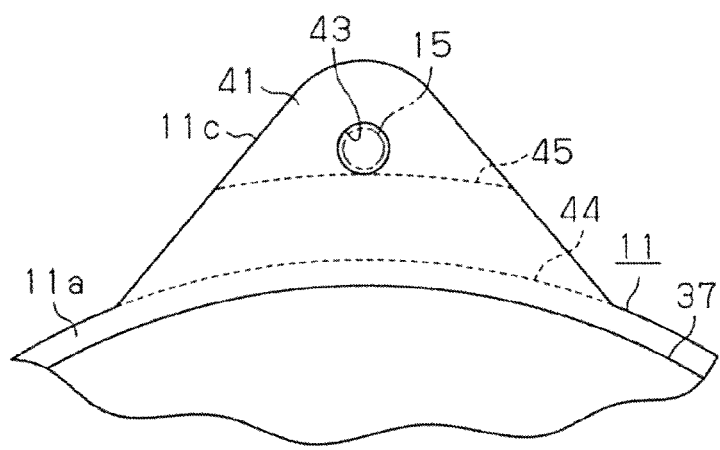
FIG. 2 is a partial enlarged plan view showing a fastening portion of a rear frame of the electric motor of the embodiment.

As shown in FIGS. 1 and 2, the seat surface 41 of the fastening portion 11c is flush with the axially outer surface 11g of the main body 11a. Furthermore, an axially inner surface 42 of the fastening portion 11c, which is axially opposite from the seat surface 41, is generally parallel with the seat surface 41 and is connected to an axially intermediate portion (axial center portion) of the outer peripheral surface of the main body 11a.

A bolt receiving hole (a through-hole) 43 is formed in each fastening portion 11c such that each bolt receiving hole 43 axially extends through the fastening portion 11c. The corresponding through bolt 15 is received through the bolt receiving hole 43, and a distal end portion of the through bolt 15 is threadably engaged with and is tightened against a female thread hole (not shown), which is formed in the corresponding fastening portion 12c of the front frame 12. In this way, each fastening portion 11c, 12c of each frame 11, 12 receives the corresponding fastening force, which is axially inwardly exerted in the axial direction of the through bolt 15, so that the frames 11, 12 are fastened together in the state where the stator core 22 is axially clamped between the stator holding portions 11b, 12b.

In the present embodiment, the fastening portions 12c also serve as installation portions, which are used to install the motor 1 to a predetermined installation location, such as a body of the vehicle. A circumferential width of each fastening portion 12c is larger than a circumferential width of each fastening portion 11c.

The rear frame 11 has reinforcing portions (ribs) 45. Each reinforcing portion (rib) 45 is formed between the axially inner surface 42 of the corresponding fastening portion 11c and the outer peripheral surface 44 of the stator holding portion 11b and serves as a deformation limiting portion. The reinforcing portion 45 radially outwardly extends from the outer peripheral surface 44 of the stator holding portion 11b and is integrally joined to the axially inner surface 42 of the fastening portion 11c. Furthermore, the reinforcing portion 45 axially extends to an axially inward distal end 46 of the stator holding portion 11b. An outer peripheral surface (a radially outer surface) of the reinforcing portion 45 is formed as a tapered surface (or a slanted surface) that is tapered or slanted such that a radial distance from the outer peripheral surface of the reinforcing portion 45 to the outer peripheral surface 44 of the stator holding portion 11b progressively decreases toward the axially inward distal end 46.

As shown in FIG. 2, a circumferential width of the reinforcing portion 45 is generally equal to a circumferential width of the fastening portion 11c (more specifically, a circumferential width of a corresponding part of the fastening portion 11c, which radially overlaps with the reinforcing portion 45). Furthermore, a radial length of the reinforcing portion 45 is generally equal to a radial length that is from the outer peripheral surface 44 of the stator holding portion 11b to an inner peripheral edge of the bolt receiving hole 43.

Next, an operation according to the present embodiment will be described.

The circuit board 37 is installed to the main body 11a of the rear frame 11. This rear frame 11 (having the circuit board 37 installed to the main body 11a) and the front frame 12 are assembled to the stator 21 from the two axial sides, respectively. Thereafter, each through bolt 15 is inserted into the bolt receiving hole 43 of the corresponding fastening portion 11c in the axial direction of the motor 1. Then, the distal end portion of the through bolt 15 is threadably tightly engaged with the female thread of the fastening portion 12c, so that the head 15a of the through bolt 15 tightly contacts the seat surface 41 of the fastening portion 11c in the axial direction of the motor 1. In this way, each fastening portion 11c, 12c receives a fastening force from the corresponding through bolt 15 toward the axially inner side in the direction toward the opposite fastening portion 11c, 12c. Thereby, the stator core 22 is securely clamped by this fastening force between the stator holding portion 11b of the rear frame 11 and the stator holding portion 12b of the front frame 12.

Here, in the present embodiment, the rigidity of the fastening portion 11c against the fastening force exerted toward the axially inner side (toward the stator holding portion 11b side) is increased by the reinforcing portion 45. Therefore, the deformation of the main body 11a toward the axially inner side caused by the fastening (tightening) of the through bolt 15 is limited, and thereby deformation (e.g., warping) of the main body 11a, which is caused by the deformation of the fastening portion 11c, is limited. Thus, deformation of the circuit board 37, which tightly contacts the main body 11a, is limited, and thereby a damage caused by the deformation of the circuit board 37 is limited. As a result, the damage of the electric component (e.g., the control circuit 38 provided to the circuit board 37) is limited.

Furthermore, in the present embodiment, the heat is generated in the stator 21 through the energization of the coils 23 at the time of rotating the motor 1. However, the heat of the stator 21 is diffused, i.e., is released from each of the frames 11, 12 to the surrounding atmosphere through the corresponding stator holding portion 11b, 12b. In this embodiment, the axial length L2 of the stator holding portion 12b is set to be shorter than the axial length L1 of the stator holding portion 11b. Therefore, the front frame 12 (more specifically, the main body 12a) is placed closer to the stator 21 in comparison to the rear frame 11 (more specifically, the main body 11a). As a result, the heat of the stator 21 is diffused, i.e., is released from the front frame 12 to the surrounding atmosphere. Furthermore, the heat, which is generated from, for example, the control circuit 38 of the circuit board 37, is mainly conducted to the rear frame 11 and is diffused, i.e., is released from the rear frame 11 to the surrounding atmosphere.

Here, each reinforcing portion 45, which is formed in the rear frame 11, can promote the diffusion, i.e., the release of the heat to the surrounding atmosphere due to the radially outwardly extending configuration of the reinforcing portion 45, which radially outwardly extends from the outer peripheral surface 44 of the stator holding portion 11b. Therefore, the release of the heat generated from the circuit board (e.g., the control circuit 38) is promoted. Furthermore, conduction of the heat of the stator 21 to the circuit board 37 through the stator holding portion 11b and the main body 11a can be limited. The reinforcing portion 45 functions as a conduction path of the heat from the stator holding portion 11b to the fastening portion 11c. Therefore, the conduction of the heat from the stator 21 to the fastening portion 11c through the reinforcing portion 45 is promoted, and thereby the diffusion, i.e., the release of the heat from the fastening portion 11c is promoted. As discussed above, because of the heat diffusing effect of the reinforcing portion 45, the increase in the temperature of the circuit board 37 is limited, and thereby the damage of, for example, the control circuit 38, caused by the heat can be limited.

Next, advantages of the present embodiment will be described.

(1) The fastening portion 11c, which radially extends from the outer peripheral surface of the main body 11a and receives the fastening force of the through bolt 15, is formed in the rear frame 11. Furthermore, the circuit board 37, which has the control circuit 38, is installed to the axially outer surface 11g of the main body 11a of the rear frame 11. Also, the reinforcing portion (the deformation limiting portion) 45, which limits the deformation of the main body 11a of the rear frame 11 caused by the fastening (tightening) of the through bolt 15, is provided in each of the fastening portions 11c. Thereby, the deformation of the main body 11a caused by the fastening (tightening) of the through bolt 15 is limited, so that the damage of the circuit board 37, which is provided to the main body 11a, can be limited. As a result, the start failure of the motor 1 can be limited.

(2) The axial length L1 of the stator holding portion 11b is larger than the axial length L2 of the stator holding portion 12b. Therefore, the amount of heat conducted from the stator 21 to the main body 11a through the stator holding portion 11b can be minimized. Thus, the damage of the circuit board 37 and the control circuit 38 caused by the combined effect of the heat and the deformation force can be limited.

(3) The deformation limiting portions include the reinforcing portions 45, each of which radially outwardly extends from the outer peripheral surface 44 of the stator holding portion 11b and is connected to the corresponding fastening portion 11c. In this way, the rigidity of each fastening portion 11c against the force toward the stator holding portion 11b is improved by the reinforcing portion 45. As a result, the deformation of the main body 11a of the rear frame 11 caused by the fastening (tightening) of each through bolt 15 can be limited. Furthermore, each reinforcing portion 45 functions as the reinforcement of the corresponding fastening portion 11c. Also, because of the radially outwardly extending configuration of the reinforcing portion 45, which radially outwardly extends from the outer peripheral surface 44 of the stator holding portion 11b, the reinforcing portion 45 implements the hear radiation function (heat releasing function) for radiating the heat of the stator 21 and the heat of the control circuit 38. Therefore, the influence of the heat on the circuit board 37 and the control circuit 38 can be minimized.

Furthermore, the reinforcing portion 45 is configured to extend from the outer peripheral surface 44 of the stator holding portion 11b and to be connected to the fastening portion 11c. Therefore, the conduction of the heat of the stator 21 from the stator holding portion 11b to the fastening portion 11c through the reinforcing portion 45 is promoted, and thereby the radiation (release) of the heat of the stator 21 through the fastening portion 11c is promoted. Therefore, the amount of heat conducted from the stator 21 to the main body 11a of the rear frame 11 can be minimized. Thus, the damage of the circuit board 37 and the control circuit 38 caused by the combined effect of the heat and the deformation force can be limited.

(4) Each reinforcing portion 45 is configured to extend to the axially inward distal end 46 of the stator holding portion 11b. Therefore, it is possible to increase the rigidity of the fastening portion 11c against the force applied toward the stator holding portion 11b. Furthermore, the axial length of the reinforcing portion 45 in the axial direction of the motor 1 can be increased, and the reinforcing portion 45 can be placed closer to the stator 21. Therefore, the radiation (release) of the heat of the stator 21 can be improved.

(5) The axially outer surface 11g of the main body 11a is formed as the flat surface, and the circuit board 37 tightly contacts the axially outer surface 11g, which is planar. Thereby, the conductivity of the heat from the circuit board 37 to the rear frame 11 is increased. Thus, the hear radiation (heat release) of the control circuit 38 through the rear frame 11 can be improved. Furthermore, the circuit board 37 and the rear frame 11 are placed adjacent to each other, so that an increase in the axial size of the motor 1 can be limited. In addition, the circuit board 37 tightly contacts the main body 11a. Therefore, in the case of occurrence of the deformation of the main body 11a, the influence of this deformation on the circuit board 37 may become large. As a result, the deformation limiting effect of the reinforcing portions 45 for limiting the deformation of the main body 11a becomes more prominent in this instance.

(6) The rear frame 11 has the through-hole 11f, which receives the rotation sensing magnet 36 installed to the rotatable shaft 32 of the motor 1 such that the rotation sensing magnet 36 is opposed to the rotation sensing device 39, which is provided to the circuit board 37. In this way, the rotation sensing magnet 36 can be received in the rear frame 11, so that it is possible to limit the increase in the axial size of the motor 1. Furthermore, the rigidity of the main body 11a may be reduced since the through-hole 11f, which receives the rotation sensing magnet 36, is formed in the rear frame 11. Therefore, the deformation limiting effect of the reinforcing portions 45 for limiting the deformation of the main body 11a becomes more prominent in this instance.

(7) The front frame 12 is placed on the one axial side of the stator 21 where the rotational force of the motor 1 is outputted through the joint 33. The circuit board 37 is provided to the rear frame 11, which is placed on the other axial side of the stator 21, which is opposite from the one axial side of the stator 21. Therefore, the circuit board 37 can be easily placed in the axially outer surface 11g of the main body 11a.

The above embodiment may be modified as follows.

In the above embodiment, the female thread hole, which is threadably engaged with the through bolt 15, is formed in the fastening portion 12c, and the head 15a of the through bolt 15 contacts the fastening portion 11c. Alternatively, the female thread hole, which is threadably engaged with the through bolt 15, may be formed in the fastening portion 11c, and the head 15a of the through bolt 15 may contact the fastening portion 12c.

In the above embodiment, the through bolt 15 is threadably engaged with the female thread hole of the fastening portion 12c. Besides this construction, the through bolt 15 may be fixed by inserting the through bolt 15 through a through-hole formed in the fastening portion 12c and tightening the through bolt 15 with a nut.

The configuration of each reinforcing portion (the rib) 45 is not limited to the one discussed in the above embodiment. For example, in the above embodiment, each reinforcing portion 45 is configured to extend to the axially inward distal end 46 of the stator holding portion 11b. Alternatively, the reinforcing portion 45 may be configured such that the stator 21 side end part of the reinforcing portion 45 is located at an axial intermediate part (e.g., an axial center part) of the stator holding portion 11b.

Furthermore, in the above embodiment, the outer peripheral surface of the reinforcing portion 45 is formed as the tapered surface (the slanted surface) that is tapered or slanted such that the radial distance from the outer peripheral surface of the reinforcing portion 45 to the outer peripheral surface 44 of the stator holding portion 11b is progressively reduced toward the axially inward distal end 46. Alternatively, the outer peripheral surface of the reinforcing portion 45 may be made generally parallel to the axial direction of the motor 1.

Furthermore, in the above embodiment, the circumferential width of the reinforcing portion 45 is generally equal to the circumferential width of the fastening portion 11c (more specifically, the circumferential width of the corresponding part of the fastening portion 11c, which radially overlaps with the reinforcing portion 45). Alternatively, the circumferential width of the reinforcing portion 45 may be made smaller than the circumferential width of the fastening portion 11c (more specifically, the circumferential width of the corresponding part of the fastening portion 11c, which radially overlaps with the reinforcing portion 45). In such a case, the reinforcing portion 45 may be provided at a plurality of circumferential locations in the circumferential direction of the motor 1 around the corresponding through bolt 15 in each corresponding fastening portion 11c.

Figure 3:
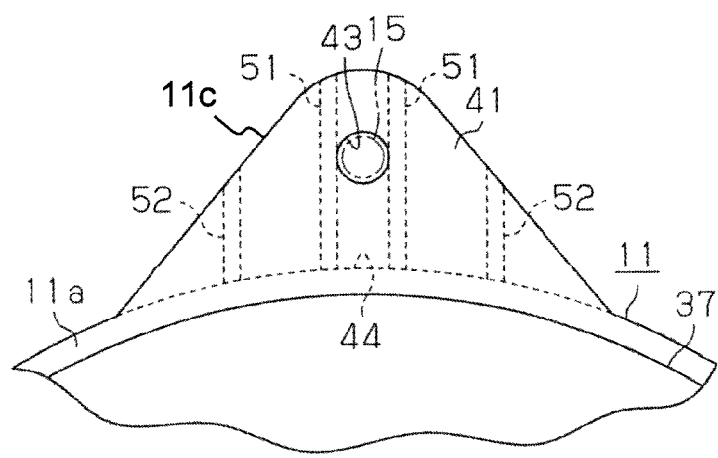
FIG. 3 is a partial enlarged plan view showing a fastening portion of a rear frame in a first modification of the embodiment.

Now, an example of providing a plurality of reinforcing portions in each corresponding fastening portion 11c will be described with reference of FIG. 3. As shown in FIG. 3, a reinforcing portion 51 and a reinforcing portion 52 are formed in each of two opposite circumferential sides of the bolt receiving hole 43 on the axially inner side of the fastening portion 11c. In the case of FIG. 3, the two reinforcing portions (a pair of reinforcing portions) 51 are placed on the circumferentially inner side (the bolt receiving hole 43 side), and the two reinforcing portions (another pair of reinforcing portions) 52 are placed on the circumferentially outer side. That is, each of the reinforcing portions 52 is placed on the circumferentially outer side of the corresponding one of the reinforcing portions 51 relative to the bolt receiving hole 43. The circumferentially inner side pair of reinforcing portions 51 is placed such that a radially outer end of each reinforcing portion 51 is placed radially outer side of the bolt receiving hole 43, and the through bolt 15 is circumferentially held between these reinforcing portions 51. More specifically, each of the reinforcing portions 51 is placed such that the reinforcing portion 51 contacts the through bolt 15 or is spaced from the through bolt 15 by 1 mm or less.

When the through bolt 15 is circumferentially held between the reinforcing portions 51 in the above described manner, the reinforcing portions 51 can be extended to the radially outer side of the bolt receiving hole 43. Thus, the rigidity of the fastening portion 11c against the force axially applied toward the stator holding portion 11b can be increased. In addition, the heat can be conducted from the reinforcing portion 51 to the through bolt 15 to radiate (release) the heat from the through bolt 15. Furthermore, the provision of the reinforcing portions 52 on the circumferentially outer side of the reinforcing portions 51, which circumferentially hold the through bolt 15 therebetween, can increase the rigidity of the fastening portion 11c.

In the above embodiment, each reinforcing portion 45 is provided as the deformation limiting portion. However, the deformation limiting portion of the present disclosure is not limited to this. That is, the deformation limiting portion of the present disclosure may be implemented in any other form as long as it can limit the deformation of the main body 11a.

Figure 4:
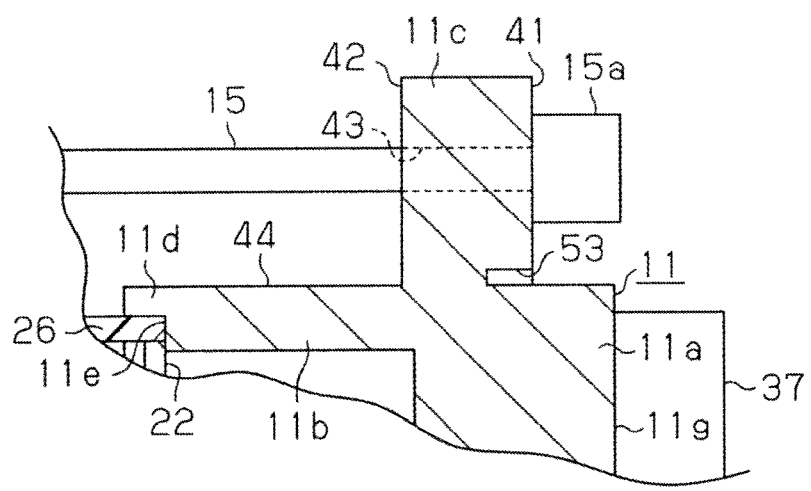
FIG. 4 is a partial enlarged cross-sectional view showing a fastening portion of a rear frame in a second modification of the embodiment.
Figure 5:
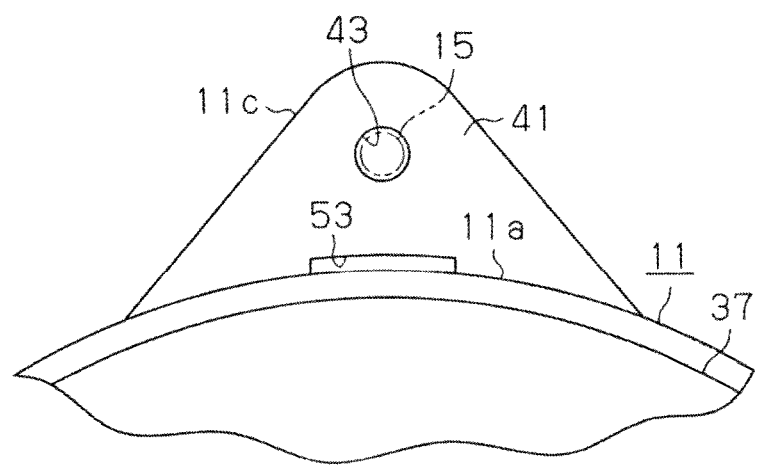
FIG. 5 is a partial enlarged plan view showing the fastening portion in the second modification of the embodiment.

For example, in another modification of the embodiment, which is shown in FIGS. 4 and 5, a recess 53 is formed as a deformation limiting portion in the seat surface 41 of the fastening portion 11c at a location, which is located between the bolt receiving hole 43 and the main body 11a in the radial direction. In the modification shown in FIGS. 4 and 5, the seat surface 41 of the fastening portion 11c extends from the outer peripheral surface of the main body 11a in a direction, which is generally perpendicular to the outer peripheral surface of the main body 11a (i.e., a direction, which is generally perpendicular the axis of the rotatable shaft 32). The seat surface 41 is axially located on the stator holding portion 11b side of the axially outer surface 11g of the main body 11a.

The recess 53 is recessed from the seat surface 41 in the axial direction of the motor 1. An axial depth of the recess 53, which is measured in a direction that is parallel to the axis of the rotatable shaft 32, is about one half of the axial wall thickness of the fastening portion 11c, which is measured in the direction that is parallel to the axis of the rotatable shaft 32. As shown in FIG. 5, the recess 53 is formed in a circumferential center part of a root (a radially inner end part) of the fastening portion 11c. A circumferential width (a circumferential extent) of the recess 53 is smaller than a circumferential width of the fastening portion 11c (more specifically, a circumferential width of the root of the fastening portion 11c). Furthermore, a radial length of the recess 53, which is measured in the radial direction (the direction perpendicular to the axis of the rotatable shaft 32), is smaller than the circumferential width of the recess 53 and the inner diameter of the bolt receiving hole 43. A radially inner side surface of the recess 53 is flush with the outer peripheral surface of the main body 11a.

With the above construction of the modification, the thickness (size) of the connection between the fastening portion 11c and the main body 11a is reduced by the recess 53. Therefore, even when the fastening portion 11c is deformed (tilted) toward the axially inner side (the front frame 12 side) by the fastening (tightening) of the through bolt 15, the influence of the deformation of the fastening portion 11c is not easily transmitted to the main body 11a. Thereby, the deformation, which is caused by the fastening of the through bolt 15, can be contained in the fastening portion 11c. Thus, the deformation of the main body 11a can be limited.

In the modification shown in FIGS. 4 and 5, the recess 53 is formed in the circumferential center part of the root of the fastening portion 11c. Alternatively, the recess 53 may be circumferentially extended throughout the root of the fastening portion 11c. Furthermore, in the modification of FIGS. 4 and 5, the radially inner side surface of the recess 53 is flush with the outer peripheral surface of the main body 11a. Alternatively, the radially inner side surface of the recess 53 may be placed on the radially outer side of the outer peripheral surface of the main body 11a. In the modification shown in FIGS. 4 and 5, the axial depth of the recess 53, which is measured in the direction that is parallel to the axis of the rotatable shaft 32, is about one half of the axial wall thickness of the fastening portion 11c, which is measured in the direction that is parallel to the axis of the rotatable shaft 32. However, the axial depth of the recess 53 is not limited to this. For example, the recess 53 may be formed as a through-hole that extends through the fastening portion 11c in the axial direction.

Figure 6:
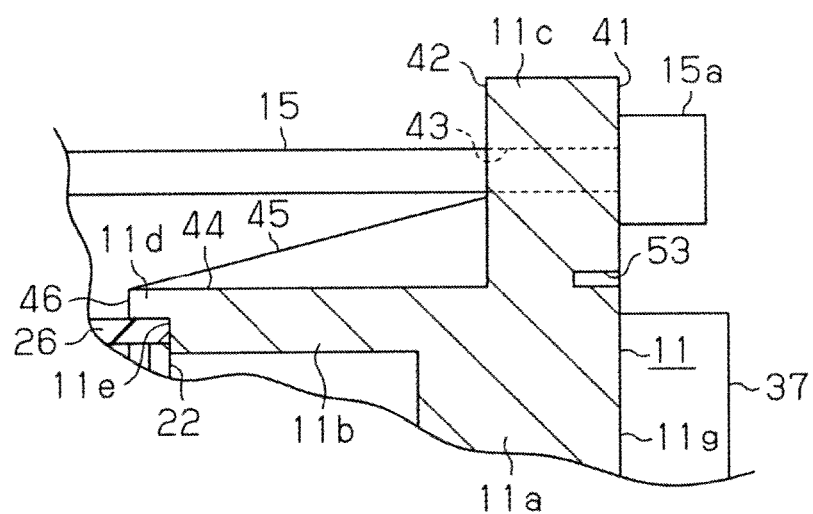
FIG. 6 is a partial enlarged cross-sectional view showing a fastening portion of a rear frame in a third modification of the embodiment.

Furthermore, the above embodiment may be modified to a modification shown in FIG. 6. Specifically, the structure shown in FIG. 6 has both of the recess 53 and the reinforcing portion 45 as the deformation limiting portions. With this construction, even when the fastening portion 11c is deformed by an excessive force, which cannot be withheld, i.e., limited by the reinforcing portion 45 alone, this deformation of the fastening portion 11c is not easily conducted to the main body 11a due to the presence of the recess 53. Therefore, the deformation of the main body 11a can be further effectively limited.

In the above embodiment, the fastening portion 11c is formed in the outer peripheral surface of the main body 11a. Additionally, the fastening portion 11c may be formed in the outer peripheral surface 44 of the stator holding portion 11b.

In the above embodiment, the axial length L1 of the stator holding portion 11b is larger than the axial length L2 of the stator holding portion 12b of the front frame 12. However, the present disclosure is not limited to this setting. For example, the axial length L1 and the axial length L2 may be generally equal to each other. Also, the axial length L1 may be smaller than the axial length L2.

In the above embodiment, the rotation sensing magnet 36, which is axially opposed to the rotation sensing device 39, is received in the through-hole 11f, which is formed in the main body 11a of the rear frame 11. That is, the rotation sensing magnet 36 is placed in the inside of the main body 11a. Alternatively, the rotation sensing magnet 36 may be axially outwardly projected from the axially outer surface 11g of the main body 11a and may be received in a receiving hole formed in the circuit board 37, so that the rotation sensing magnet 36 is opposed to the rotation sensing device 39 in the radial direction.

In the above embodiment, the circuit board 37 is fixed to the main body 11a such that the circuit board 37 tightly contacts the axially outer surface 11g of the main body 11a. Alternatively, the circuit board 37 may be fixed to the main body 11a such that a gap is placed between the circuit board 37 and the axially outer surface 11g.

In the above embodiment, the circuit board 37 is provided to the main body 11a of the rear frame 11, and the reinforcing portion 45 is provided to the fastening portion 11c. However, the present disclosure is not limited to this construction. For example, the circuit board 37 may be provided to the main body 12a of the front frame 12, and the reinforcing portion 45 may be provided to the fastening portion 12c.

In the above embodiment, the outer peripheral surface 22a of the stator core 22 is covered with the cover member 26, which is anticorrosive. However, the present disclosure is not limited to this. For instance, in a case, where it is not required to limit the formation of the rust in the outer peripheral surface 22a of the stator core 22, the cover member 26 may be eliminated.

In this construction where the cover member 26 is eliminated, the outer peripheral surface 22a of the stator core 22 is directly exposed to the external air. Therefore, the radiation (release) of the heat from the outer peripheral surface 22a is promoted.

Additional advantages and modifications will readily occur to those skilled in the art. The present disclosure in its broader terms is therefore not limited to the specific details and illustrative examples shown and described.

What is claimed is:

1. An electric motor comprising:
   a stator;
   a first frame and a second frame that axially hold the stator therebetween; and
   a through bolt that is placed on a radially outer side of the stator and fastens the first frame and the second frame together to limit movement of the first frame and the second frame away from each other, wherein:
   each of the first frame and the second frame includes a main body, which is configured into a circular disk form, and a stator holding portion, which extends from the main body in an axial direction and is configured into an annular form;
   the stator holding portion of the first frame and the stator holding portion of the second frame clamp the stator therebetween in the axial direction;
   the first frame has a fastening portion, which radially extends from an outer peripheral surface of the first frame and receives a fastening force of the through bolt;
   a circuit board, which includes a control circuit, is installed to an axially outer surface of the main body of the first frame;
   at least one deformation limiting portion is provided in the fastening portion to limit deformation of the main body of the first frame, which is caused by the fastening force of the through bolt;
   the fastening portion includes a receiving hole that receives the through bolt and opens in an axial end surface of the fastening portion, which is axially opposite from the stator;
   the at least one deformation limiting portion includes a recess that is formed at a location, which is between the receiving hole of the fastening portion and the main body of the first frame in a radial direction of the first frame and is located in the axial end surface of the fastening portion that is axially opposite from the stator; and
   the recess is recessed in the axial end surface of the fastening portion toward the stator in the axial direction.

2. The electric motor according to claim 1, wherein an axial length of the stator holding portion of the first frame is longer than an axial length of the stator holding portion of the second frame.

3. The electric motor according to claim 1, wherein the at least one deformation limiting portion includes a reinforcing portion, which radially outwardly extends from an outer peripheral surface of the stator holding portion of the first frame and is connected to the fastening portion.

4. The electric motor according to claim 3, wherein the reinforcing portion extends to an axially inward distal end of the stator holding portion of the first frame.

5. The electric motor according to claim 3, wherein the at least one deformation limiting portion includes at least one pair of reinforcing portions, which are circumferentially placed on two opposite circumferential sides, respectively, of the through bolt.

6. The electric motor according to claim 1, wherein:
   an axially outer surface of the main body of the first frame is a flat surface; and
   the circuit board tightly contacts the flat surface.

7. The electric motor according to claim 1, wherein the first frame has a through-hole that extends through the first frame and receives a rotation sensing magnet, which is installed to a rotatable shaft of the electric motor to oppose a rotation sensing device that is installed to the circuit board.

8. The electric motor according to claim 1, wherein:
   the second frame is placed on one axial side of the stator where a rotational force of the electric motor is outputted; and
   the first frame is placed on the other axial side of the stator, which is opposite from the one axial side of the stator.

* * * * *